United States Patent
Kanematsu

(10) Patent No.: US 10,645,239 B2
(45) Date of Patent: May 5, 2020

(54) IMAGE PROCESSING APPARATUS THAT IS CONNECTABLE WITH INFORMATION PROCESSING APPARATUS PROVIDING SERVICE TO IMAGE PROCESSING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Shinichi Kanematsu, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/270,923

(22) Filed: Feb. 8, 2019

(65) Prior Publication Data
US 2019/0260889 A1  Aug. 22, 2019

(30) Foreign Application Priority Data
Feb. 21, 2018 (JP) .................. 2018-028878

(51) Int. Cl.
*H04N 1/00* (2006.01)

(52) U.S. Cl.
CPC ..... *H04N 1/00477* (2013.01); *H04N 1/00244* (2013.01); *H04N 1/00323* (2013.01); *H04N 1/00344* (2013.01); *H04N 1/00925* (2013.01); *H04N 2201/0094* (2013.01)

(58) Field of Classification Search
CPC ........... H04N 1/00477; H04N 1/00244; H04N 1/00344; H04N 1/00925; H04N 1/00323; H04N 2201/0094; H04N 1/00002; H04N 1/00029; H04N 1/00053; H04N 1/00061; G06K 3/121; G06K 3/1229; G06K 3/1234; G06K 3/125; G06K 15/408; G06F 3/121; G06F 3/1229; G06F 3/1234
See application file for complete search history.

(56) References Cited

U.S. PATENT DOCUMENTS 7,061,634 B1 * 6/2006 Ogura ............... G03G 15/5079
358/1.15

FOREIGN PATENT DOCUMENTS

JP 2014073632 A 4/2014

* cited by examiner

*Primary Examiner* — Kent Yip
(74) *Attorney, Agent, or Firm* — Rossi, Kimms & McDowell LLP

(57) ABSTRACT

An image processing apparatus that is capable of coping with an error promptly. The image processing apparatus is connectable with an information processing apparatus providing service to the image processing apparatus. A detection unit detects occurrence of a predetermined error in the image processing apparatus. A display control unit controls display of a notification screen that notifies a user of the predetermined error detected by the detection unit on a display unit of the image processing apparatus. The display control unit controls the display so that the notification screen will include a message that prompts contact with a manager of the image processing apparatus in a case where a contract of receiving service from the information processing apparatus is invalid. The display control unit controls the display so that the notification screen will not include the message in a case where the contract is valid.

15 Claims, 12 Drawing Sheets

*FIG. 9*

| ERROR TYPE | DISPLAY TO PROMPT "CONTACT WITH ALLOTTED SERVICE DEPARTMENT" |
|---|---|
| FATAL ERROR | DISPLAY |
| PARTIAL ERROR | DISPLAY ACCORDING TO SERVER CONNECTION STATE |
| ERROR SIGN | NOT DISPLAY |

IMAGE PROCESSING APPARATUS THAT IS CONNECTABLE WITH INFORMATION PROCESSING APPARATUS PROVIDING SERVICE TO IMAGE PROCESSING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus that is connectable with an image processing apparatus providing service to the image processing apparatus, a control method therefor, and a storage medium storing a control program therefor.

Description of the Related Art

There is a known image processing apparatus that performs self-diagnostics for detecting errors, such as operational abnormalities and failures of mounted parts. The image processing apparatus displays warning notification on a display unit of the image processing apparatus when an error occurs. The warning notification includes an error code that indicates a content of the occurred error, for example. Moreover, when a serious error that a user cannot repair occurs, the warning notification includes a message that prompts contact with an allotted service department of the image processing apparatus in addition to the above-mentioned error code. The user requests the allotted service department shown by the displayed message to repair, and a service person dispatched from the allotted service department repairs the image processing apparatus.

Moreover, remote monitoring service may be used as another method to request repair of the image processing apparatus. In the remote monitoring service, a monitoring server that is managed by a sales company of the image processing apparatus monitors occurrence of an error of the image processing apparatus after obtaining a user's approval. When a serious error occurs in the image processing apparatus that uses the remote monitoring service, the allotted service department is requested to repair via the monitoring server. Accordingly, the image processing apparatus using the remote monitoring service does not display the message that prompts contact with the allotted service department of the image processing apparatus on a display unit when a serious error occurs (for example, see Japanese Laid-Open Patent Publication (Kokai) No. 2014-73632 (JP 2014-73632A)).

However, when the monitoring server is in a state where occurrence of an error in the image processing apparatus cannot be detected, the allotted service department is not requested to repair via the monitoring server, which causes a problem that delays coping of the error in the prior art.

SUMMARY OF THE INVENTION

The present invention provides an image processing apparatus, a control method therefor, and a storage medium storing a control program therefor, which are capable of coping with an error promptly.

Accordingly, a first aspect of the present invention provides an image processing apparatus that is connectable with an information processing apparatus providing service to the image processing apparatus, the image processing apparatus including a detection unit configured to detect occurrence of a predetermined error in the image processing apparatus, and a display control unit configured to control display of a notification screen that notifies a user of the predetermined error detected by the detection unit on a display unit of the image processing apparatus. The display control unit controls the display so that the notification screen displayed on the display unit will include a message that prompts contact with a manager of the image processing apparatus in a case where a contract of receiving service from the information processing apparatus is invalid. The display control unit controls the display so that the notification screen displayed on the display unit will not include the message that prompts contact with the manager of the image processing apparatus in a case where the contract of receiving service from the information processing apparatus is valid.

Accordingly, a second aspect of the present invention provides a control method for an image processing apparatus that is connectable with an information processing apparatus providing service to the image processing apparatus, the control method including a detection step of detecting occurrence of a predetermined error in the image processing apparatus, and a display control step of controlling display of a notification screen that notifies a user of the predetermined error detected in the detection step on a display unit of the image processing apparatus. The display is controlled so that the notification screen displayed on the display unit will include a message that prompts contact with a manager of the image processing apparatus in the display control step in a case where a contract of receiving service from the information processing apparatus is invalid. The display is controlled so that the notification screen displayed on the display unit will not include the message that prompts contact with the manager of the image processing apparatus in the display control step in a case where the contract of receiving service from the information processing apparatus is valid.

Accordingly, a third aspect of the present invention provides a non-transitory computer-readable storage medium storing a control program causing a computer to execute the control method of the second aspect.

The present invention is able to cope with the error promptly.

Further features of the present invention will become apparent from the following description of exemplary embodiments with reference to the attached drawings.

BRIEF DESCRIPTION OF THE DRAWINGS

FIG. 9 is a view showing types of errors that occur in the MFP shown in FIG. 1 and corresponding display states.

DESCRIPTION OF THE EMBODIMENTS

Hereafter, embodiments according to the present invention will be described in detail with reference to the drawings. Although the embodiment describes the case where the present invention is applied to an MFP as an image processing apparatus monitored by a monitoring server, an applying target of the present invention is not limited to an MFP. For example, the present invention may be applied to devices, such as a mobile terminal and a client PC that are communicable with a monitoring server.

Figure 1:
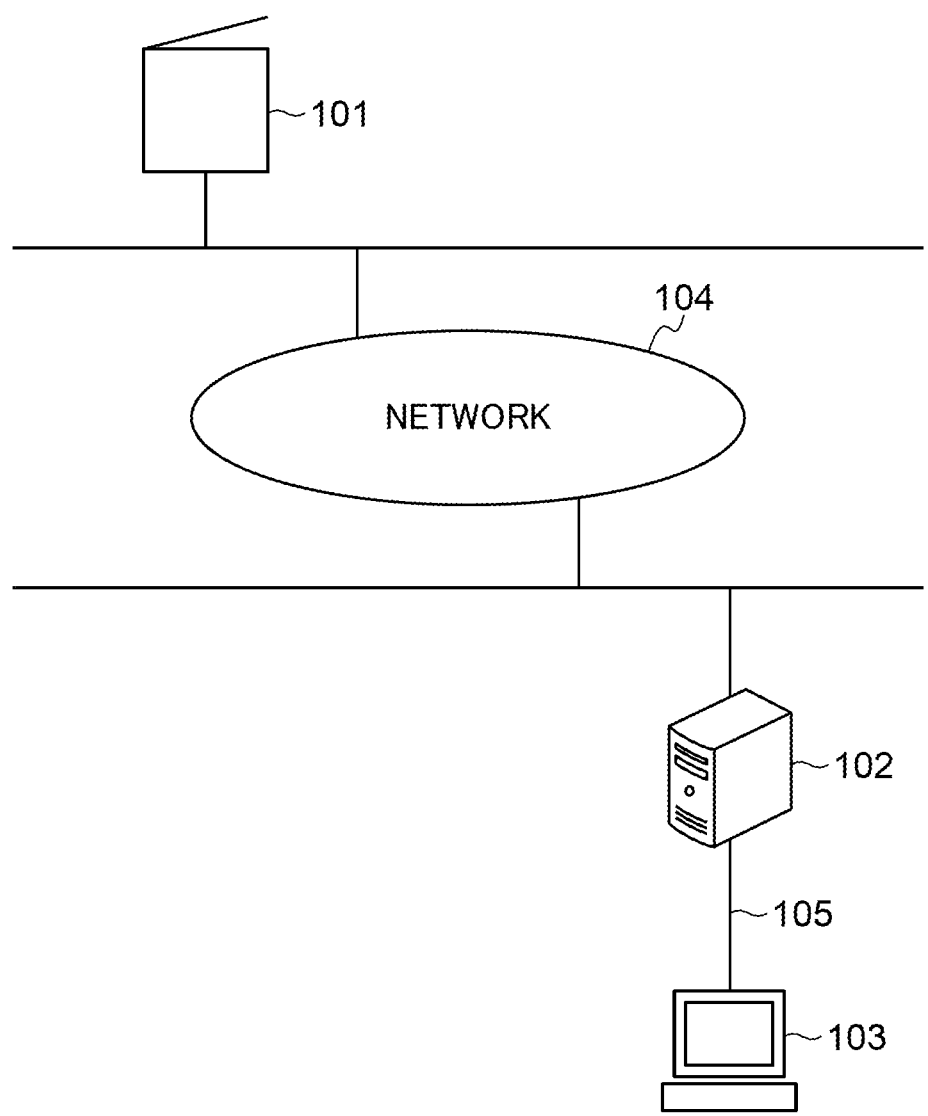
FIG. 1 is a network diagram schematically showing a configuration of a communication system including an MFP as an image processing apparatus according to an embodiment of the present invention.

FIG. 1 is a network diagram schematically showing a configuration of a communication system 100 including an MFP 101 as the image processing apparatus according to the embodiment of the present invention. As shown in FIG. 1, the communication system 100 are provided with the MFP 101, a monitoring server 102 as a monitoring apparatus (an information processing apparatus), and a service-dispatch management server 103. The MFP 101 and the monitoring server 102 are connected through a network 104. The monitoring server 102 and the service-dispatch management server 103 are connected through a LAN 105.

The MFP 101 receives PDL data from an external apparatus (not shown) connected through the network 104 and prints according to the received PDL data. Moreover, the MFP 101 reads an original arranged with a scanner 308 shown in FIG. 3 mentioned later and generates image data. In the MFP 101, when support registration is performed using a support registration screen 600 in FIG. 6 mentioned later aside from a maintenance contract of the MFP 101, a contract of receiving service from the monitoring server 120 becomes valid, and remote monitoring service is activated. In the remote monitoring service, the monitoring server 102 monitors an occurrence situation of a predetermined phenomenon in the MFP, which is an alert related to an abnormality of the MFP 101 (hereinafter referred to as an "abnormality-related alert") specifically. When the abnormality-related alert occurs in the MFP 101 after activating the remote monitoring service, the MFP 101 sends alert information including a content of the above-mentioned abnormality-related alert to the monitoring server 102. The monitoring server 102 monitors the occurrence situation of the abnormality-related alert in the apparatus that the support registration has been performed. For example, when receiving alert information including the content of the abnormality-related alert from the MFP 101, the monitoring server 102 detects the occurrence of the alert in the MFP 101 on the basis of the above-mentioned alert information and sends a dispatch request of a service person who repairs the MFP 101 to the service-dispatch management server 103. The service-dispatch management server 103 arranges a service person in response to the dispatch request received from the monitoring server 102.

Figure 2:
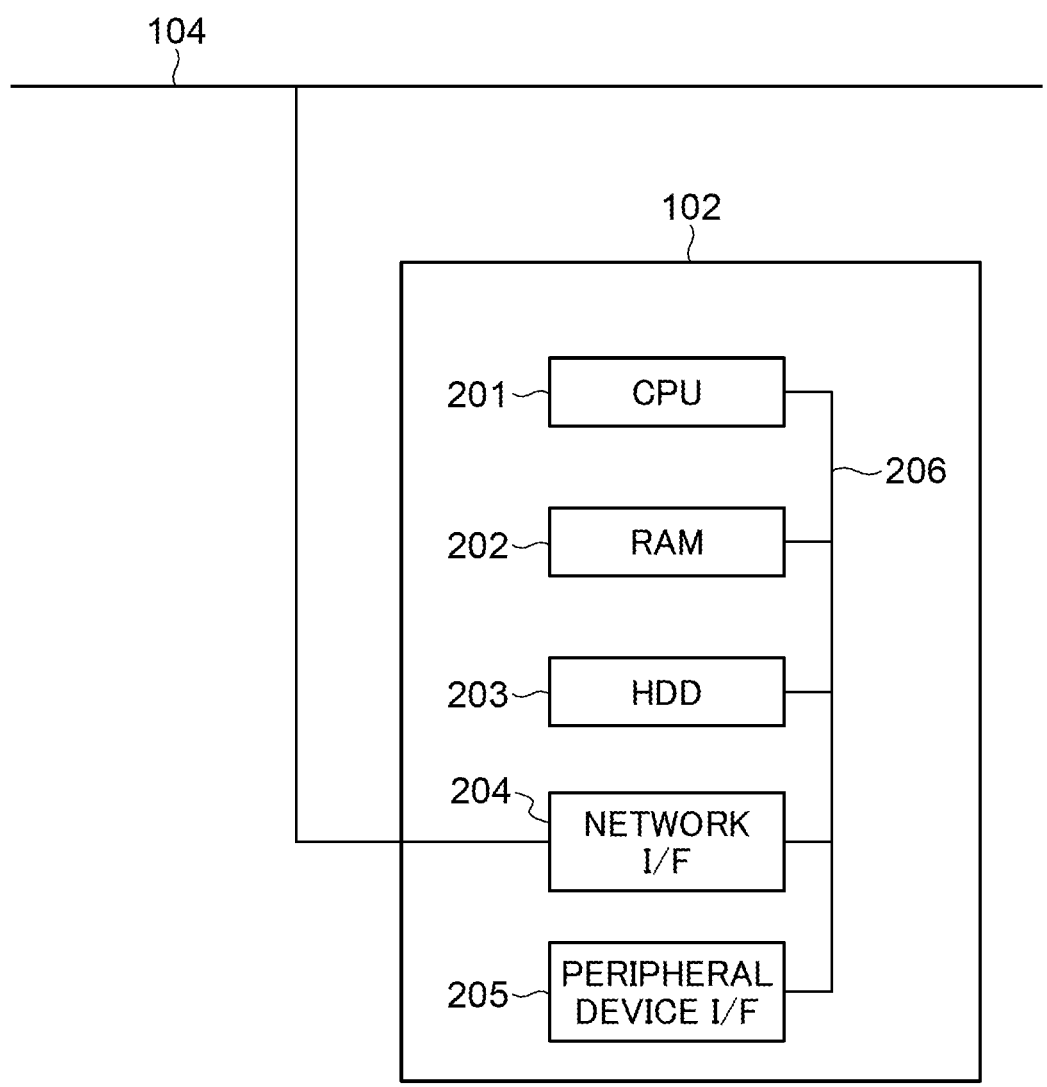
FIG. 2 is a block diagram schematically showing a configuration of a monitoring server shown in FIG. 1.

FIG. 2 is a block diagram schematically showing the configuration of the monitoring server 102 shown in FIG. 1. As shown in FIG. 2, the monitoring server 102 is provided with a CPU 201, a RAM 202, an HDD 203, a network I/F 204, and a peripheral device I/F 205. The CPU 201, RAM 202, HDD 203, network I/F 204, and peripheral device I/F 205 are mutually connected through a system bus 206.

The CPU 201 integrally controls the entire monitoring server 102. The CPU 201 develops a program read from the HDD 203 to the RAM 202 and runs the program developed to the RAM 202. The HDD 203 stores a program executed by the CPU 201. The RAM 202 is used as a working area of the CPU 201 and is used as a temporary storage area for data. The network I/F 204 performs data communication with an external apparatus like the MFP 101 connected through the network 104. Moreover, the network I/F 204 performs data communication with the service-dispatch management server 103 connected through the LAN 105. The peripheral device I/F 205 is an interface for connecting peripheral devices (not shown), such as a display unit and a keyboard, to the monitoring server 102. The monitoring server 102 outputs information to a user and receives an instruction from a user by controlling the peripheral devices connected to the peripheral device I/F 205.

Figure 3:
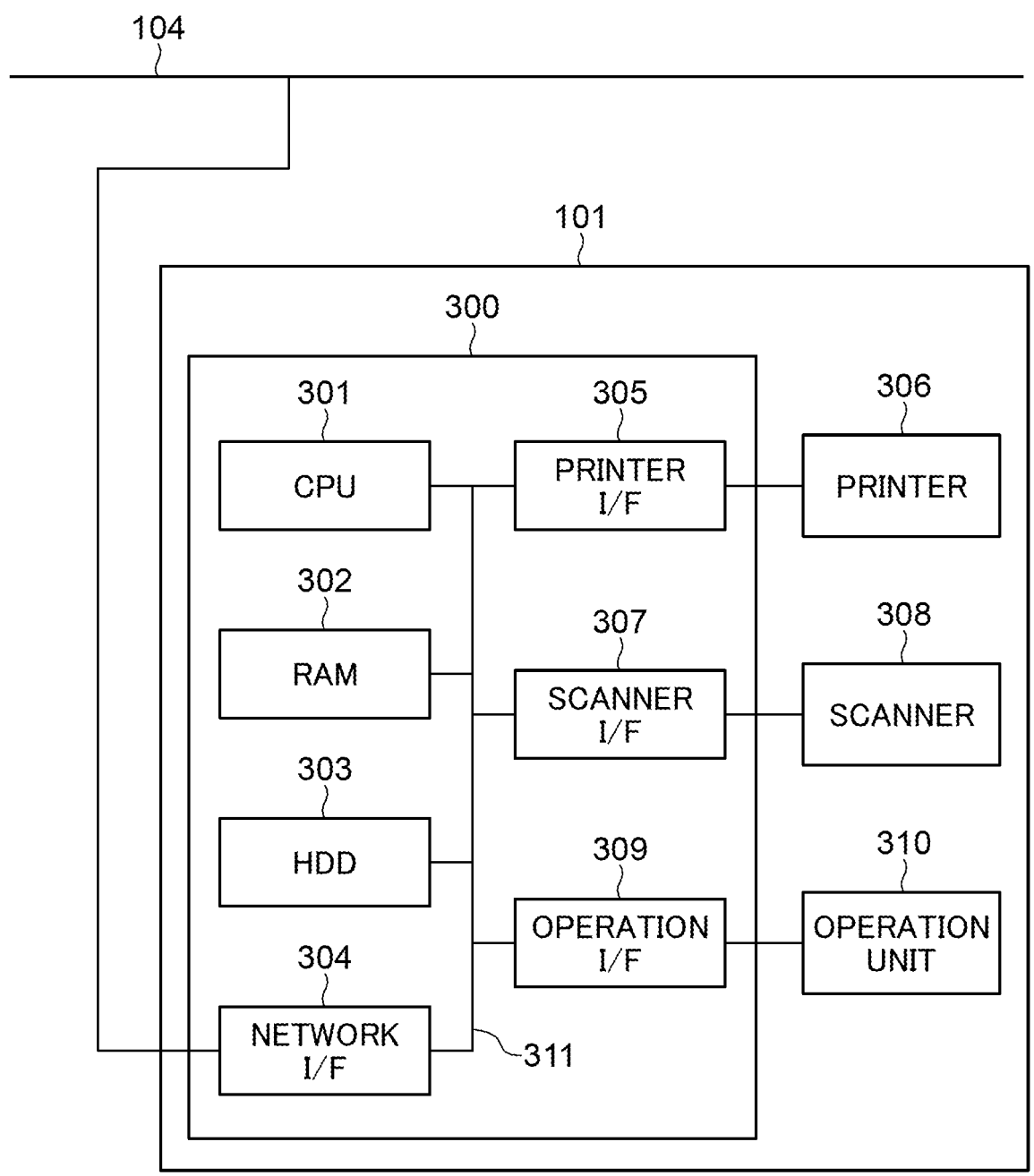
FIG. 3 is a block diagram schematically showing the configuration of the MFP shown in FIG. 1.

FIG. 3 is a block diagram schematically showing the configuration of the MFP 101 shown in FIG. 1. The MFP 101 is provided with a controller 300, a printer 306, the scanner 308, and an operation unit 310. The controller 300 is connected with the printer 306, the scanner 308, and the operation unit 310. Moreover, the controller 300 is provided with a CPU 301, a RAM 302, an HDD 303, a network I/F 304, a printer I/F 305, a scanner I/F 307, and an operation I/F 309. The CPU 301, RAM 302, HDD 303, network I/F 304, printer I/F 305, scanner I/F 307, and operation I/F 309 are mutually connected via a system bus 311.

The controller 300 integrally controls the entire MFP 101. The CPU 301 develops a program read from the HDD 303 to the RAM 302 and runs the program developed to the RAM 302. The RAM 302 is used as a working area of the CPU 301, and is used as a temporary storage area for data. The HDD 303 stores a program that the CPU 301 runs, various setting values of the MFP 101, data about a process requested by a user, and data received from the external apparatus, etc. The network I/F 304 performs data communication with an external apparatus like the monitoring server 102 connected through the network 104.

The printer I/F 305 is an interface for connecting the controller 300 and the printer 306. For example, the printer I/F 305 transfers the image data sent from the CPU 301 to the printer 306. Moreover, the printer I/F 305 transfers status information about the printer 306 received from the printer 306 concerned to the CPU 301. The printer 306 prints the image data received from printer I/F on a sheet. Moreover, the printer 306 outputs the status information about the printer 306 concerned to the printer I/F 305.

The scanner IX 307 is an interface for connecting the controller 300 and the scanner 308. For example, the scanner I/F 307 transfers an image-reading instruction sent from the CPU 301 to the scanner 308. Moreover, the scanner I/F 307 transfers the image data received from the scanner 308 to the CPU 301. Furthermore, the scanner I/F 307 transfers the status information about the scanner 308 received from the scanner 308 concerned to the CPU 301. The scanner 308 reads an original arranged according to the image-reading instruction received from the scanner I/F 307 and outputs digital data of the read information to the scanner I/F 307.

Moreover, the scanner 308 outputs the status information about the scanner 308 concerned to the scanner I/F 307.

The operation I/F 309 outputs the content of the instruction that the user has input through the operation unit 310 to the CPU 301. Moreover, the operation I/F 309 controls the display of the screen of the operation unit 310 according to a control signal received from the CPU 301. The operation unit 310 is a user interface of the MFP 101. The operation unit 310 is provided with a display unit 401, a start key 402, a ten-key pad 403, and a stop key 404 as shown in FIG. 4.

Figure 5:
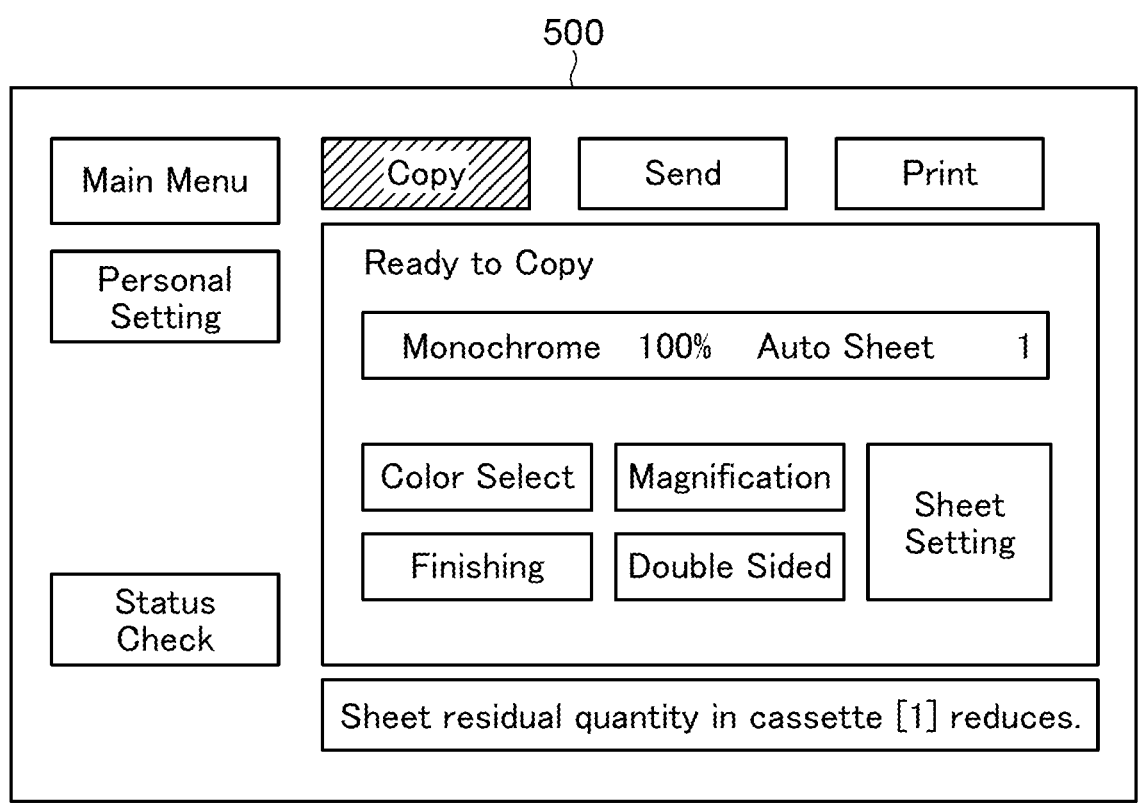
FIG. 5 is a view showing an example of a setting screen displayed on a display unit shown in FIG. 4.

The display unit 401 consists of an LCD and a touch panel sheet that covers a surface of the LCD. The display unit 401 displays various setting screens including soft keys (a setting screen 500 in FIG. 5, for example) and sends position information indicating a pressed position to the CPU 201 when a user presses a displayed soft key. The start key 402 is used, for example, when a user instructs the MFP 101 to start an original reading operation. A red LED and a green LED are provided in the center of the start key 402. Lighting of the red LED indicates that the start key is unavailable and lighting of the green LED indicates that the start key is available. The ten-key pad 403 consists of numeral buttons and character buttons and is used when a user instructs setting of print copies and switching of the screen on the display unit 401, for example. The stop key 404 is used when a user instructs the MFP 101 to stop an action under operation, for example.

Figure 4:
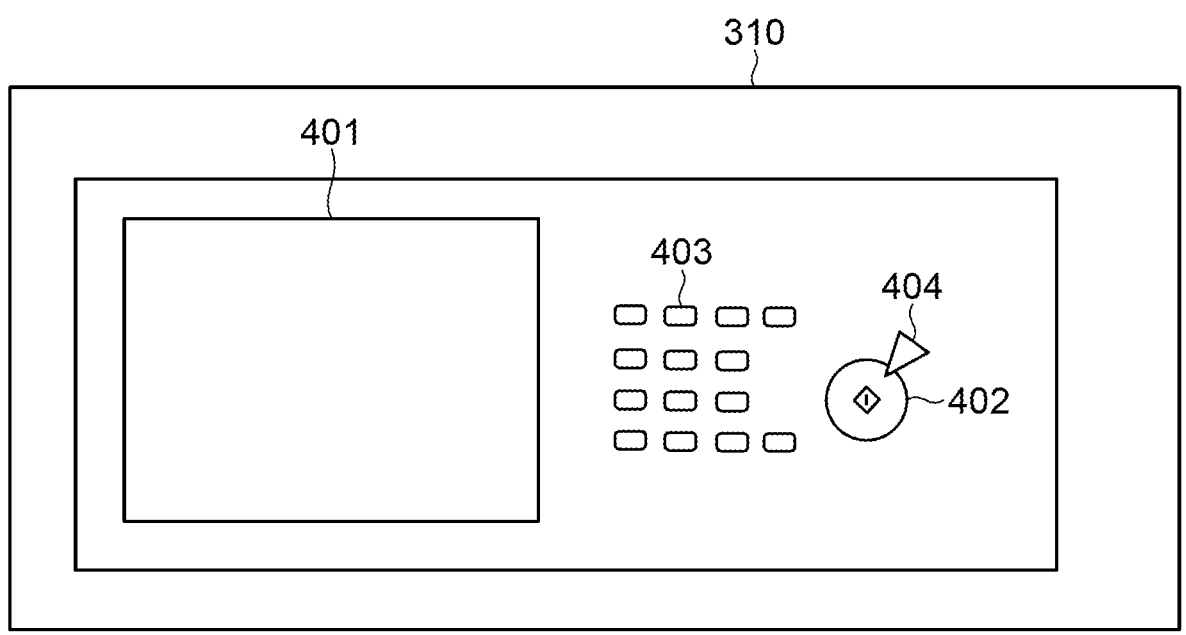
FIG. 4 is an external view of an operation unit shown in FIG. 3.
Figure 6:
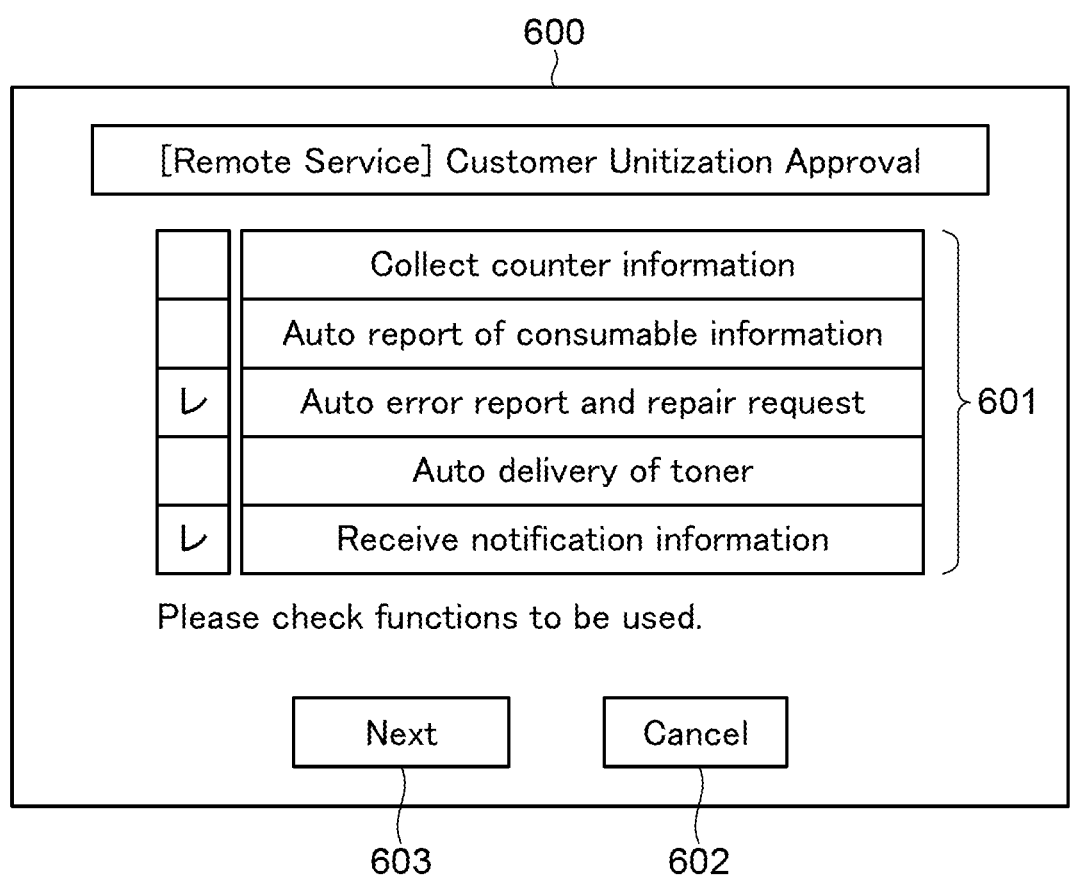
FIG. 6 is a view showing an example of a support registration screen displayed on the display unit shown in FIG. 4.
Figure 7:
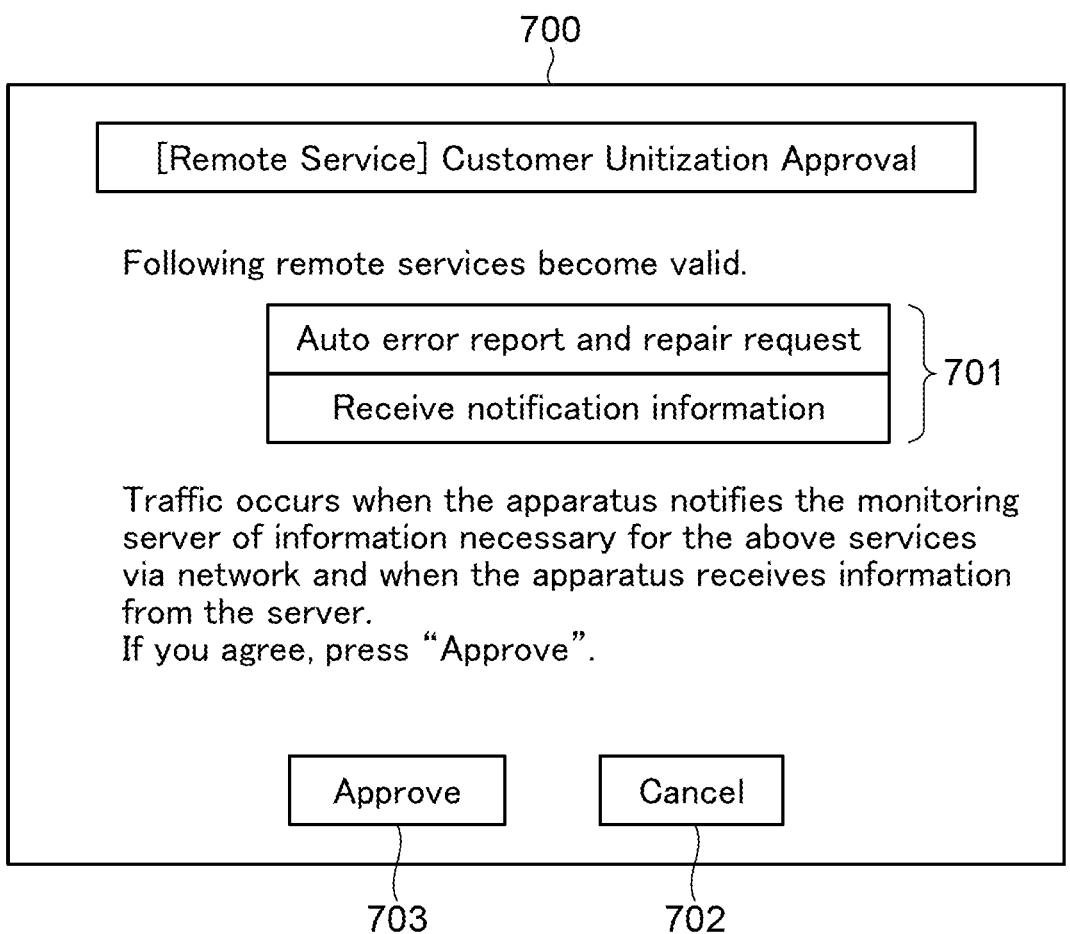
FIG. 7 is a view showing an example of an approval setting screen displayed on the display unit shown in FIG. 4.

FIG. 6 is a view showing an example of a support registration screen displayed on the display unit 401 shown in FIG. 4. The support registration screen 600 is a setting screen for performing the support registration of the remote monitoring service. The support registration screen 600 includes a service list 601, a cancel button 602, and a next button 603. The service list 601 displays the services that are available in the remote monitoring service. A user is able to select desired service from the service list 601. When the cancel button 602 is pressed in the support registration screen 600, the display of the display unit 401 switches from the support registration screen 600 to another screen without activating the remote monitoring service of the MFP 101. When the next button 603 is pressed on the support registration screen 600, the display on the display unit 401 switches from the support registration screen 600 to an approval setting screen 700 in FIG. 7.

The approval setting screen 700 includes a cancel button 702 and an approval button 703. Information showing the service selected from the service list 601, cautions accompanying use of the remote monitoring service, a consent confirmation item, etc. are displayed on a display column 701 in the approval setting screen 700. When the cancel button 702 is pressed in the approval setting screen 700, the display of the display unit 401 switches from the approval setting screen 700 to another screen without activating the remote monitoring service of the MFP 101. When the approval button 703 is pressed in the approval setting screen 700, the communication setting of the monitoring server 102 showing that the MFP 101 communicates with the monitoring server 102 is set to "ON", and the remote monitoring service of the MFP 101 is activated. Thereby, when the MFP 101 causes an alert showing a serious abnormality that a user cannot repair, the service-dispatch management server 103 arranges a service person who repairs the MFP 101 even if the user does not inquire of the allotted service department (a manager, a service department in charge of repair).

Figure 8:
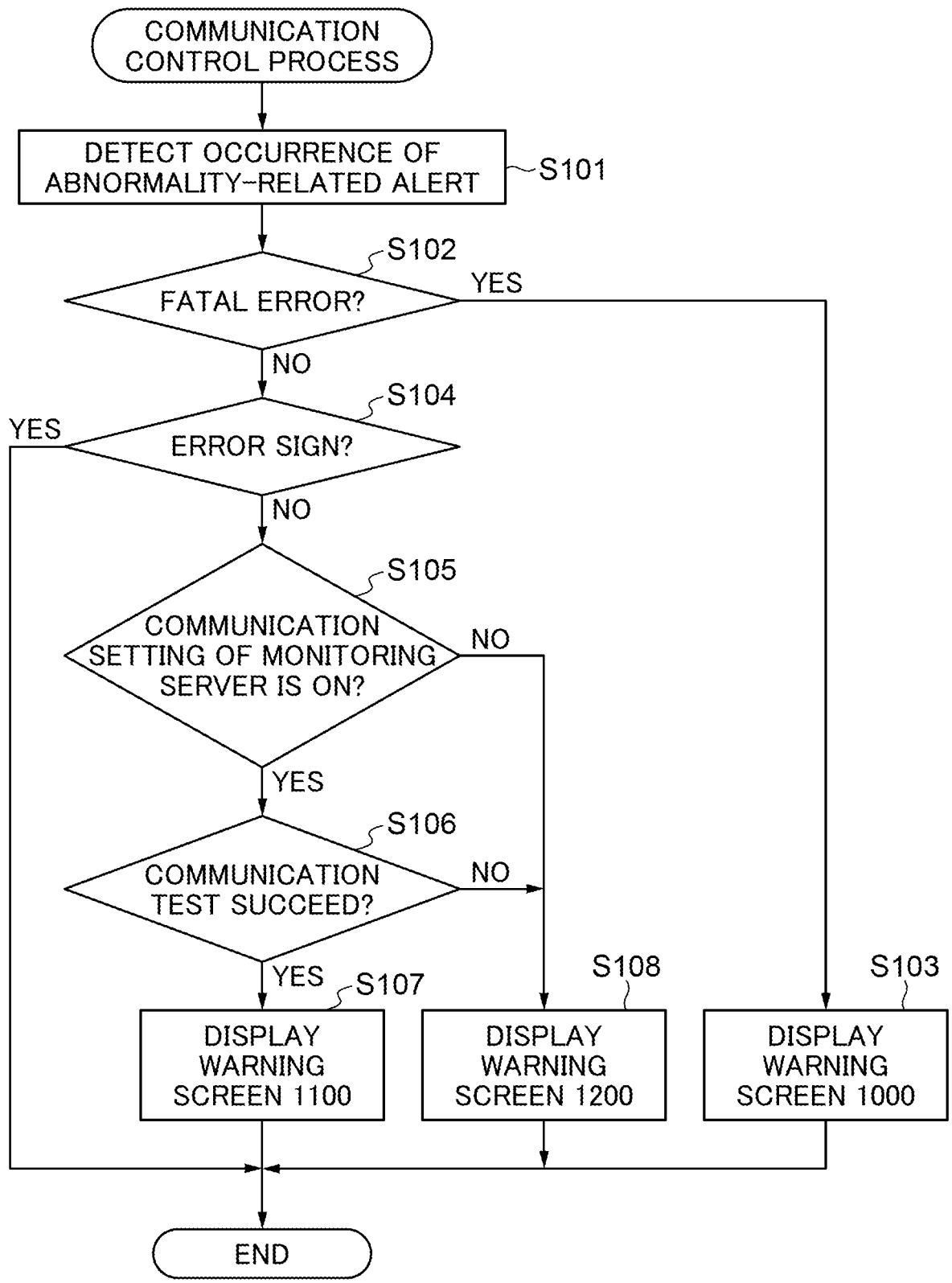
FIG. 8 is a flowchart showing procedures of a communication control process executed by the MFP shown in FIG. 1.

FIG. 8 is a flowchart showing procedures of a communication control process executed by the MFP 101 shown in FIG. 1. The process in FIG. 8 is performed when the CPU 301 runs a program stored in the HDD 303. The process in FIG. 8 is executed when the abnormality-related alert occurs in the MFP 101.

As shown in FIG. 8, the CPU 301 detects occurrence of the abnormality-related alert (step S101). Specifically, the abnormality-related alert is classified into one of a fatal error, a partial error, and an error sign that are shown in FIG. 9. The fatal error occurs when the abnormality that inactivates all the functions of the MFP 101 is detected. When the fatal error occurs, the user cannot use the MFP 101 until the abnormal condition is solved. The partial error occurs when the abnormality that inactivates a part of the functions of the MFP 101 is detected. When the partial error occurs, although the use of the part of the functions is restricted, the user is able to use functions other than the restricted functions. For example, when the partial error due to abnormality of the scanner 308 occurs, although the user cannot use the scan function or the copy function accompanying the scan operation, the user can use the print function not accompanying the scan operation. The error sign occurs when a sign of the abnormality that inactivates at least one of the functions of the MFP 101 is detected. In the step where the error sign is detected, the user can use all the functions of the MFP 101 without restriction. In the embodiment, notification given to the user varies according to the type of the occurred abnormality-related alert. Next, the CPU 301 determines whether the type of the occurred abnormality-related alert is the "fatal error" in step S102.

Figure 10:
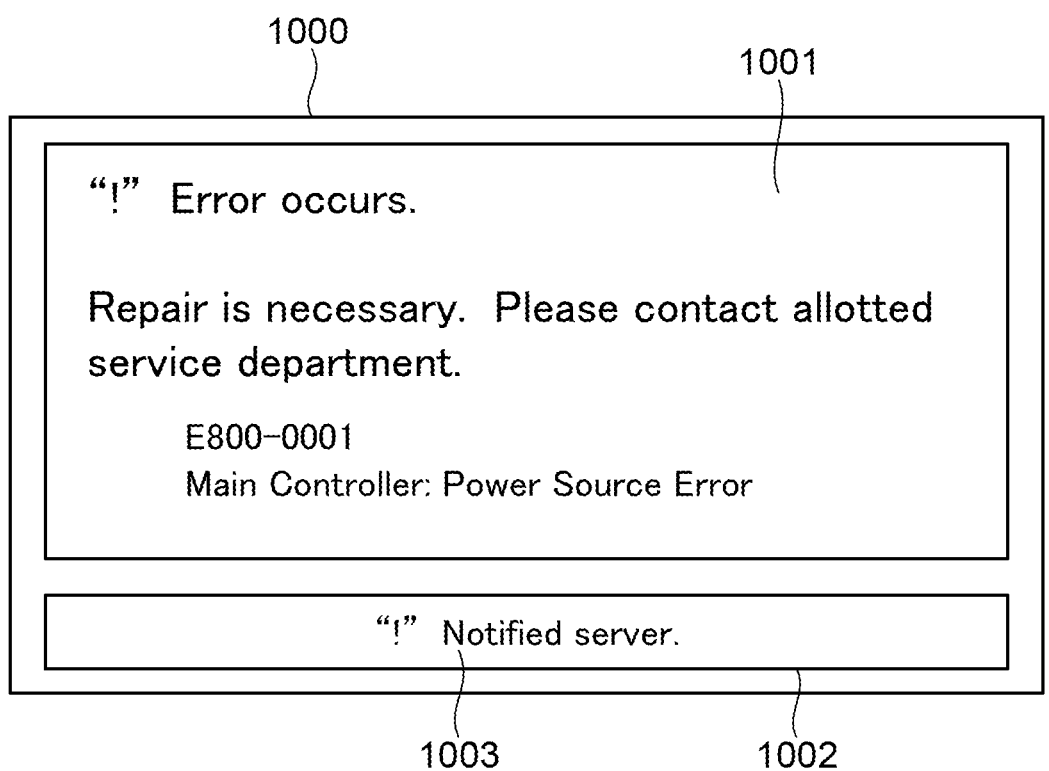
FIG. 10 is a view showing a first example of a warning screen displayed on the display unit shown in FIG. 4.

As a result of the determination in the step S102, when the type of the occurred abnormality-related alert is the "fatal error", the CPU 301 displays a warning screen 1000 shown in FIG. 10 on the display unit 401 as notification to the user (step S103). The warning screen 1000 includes a message 1001 that prompts contact with the allotted service department. Moreover, when the remote monitoring service is activated, the CPU 301 sends the alert information including the content of the abnormality-related alert and the identification ID of the MFP 101 to the monitoring server 102. At this time, a message 1003 showing that the alert information has been sent to the monitoring server 102 is displayed in a status display section 1002 of the warning screen 1000. Thus, in the embodiment, when the abnormality that inactivates all the functions of the MFP 101 is detected, priority is given to the quick arrangement of a service person and repair is requested through the monitoring server 102. At the same time, a method that a user requests repair is also provided. Then, the CPU 301 finishes this process.

As a result of the determination in the step S102, when the type of the occurred abnormality-related alert is not the "fatal error", the CPU 301 determines whether the type of the occurred abnormality-related alert is the "error sign" in step S104.

As a result of the determination in the step S104, when the type of the occurred abnormality-related alert is the "error sign", the CPU 301 does not notify the user. That is, the CPU 301 finishes this process without displaying a warning screen on the display unit 401.

As a result of the determination in the step S104, when the type of the occurred abnormality-related alert is not the "error sign", the CPU 301 determines that the occurred abnormality-related alert is the "partial error". Then, the CPU 301 determines whether the communication setting of the monitoring server 102 is "ON" (step S105).

As a result of the determination in the step S105, when the communication setting of the monitoring server 102 is "ON", the CPU 301 determines whether the communication test of the monitoring server 102 succeeded (step S106). In the step S106, the CPU 301 determines whether the communication test that was executed at the time when the occurrence of the abnormality-related alert was detected in the step S101 succeeded, for example. Alternatively, the CPU 301 performs the determination process in the step S106 on the basis of the execution result of the communication test of the monitoring server 102 executed periodically irrespective of detection of occurrence of an abnormality-related alert.

Figure 11:
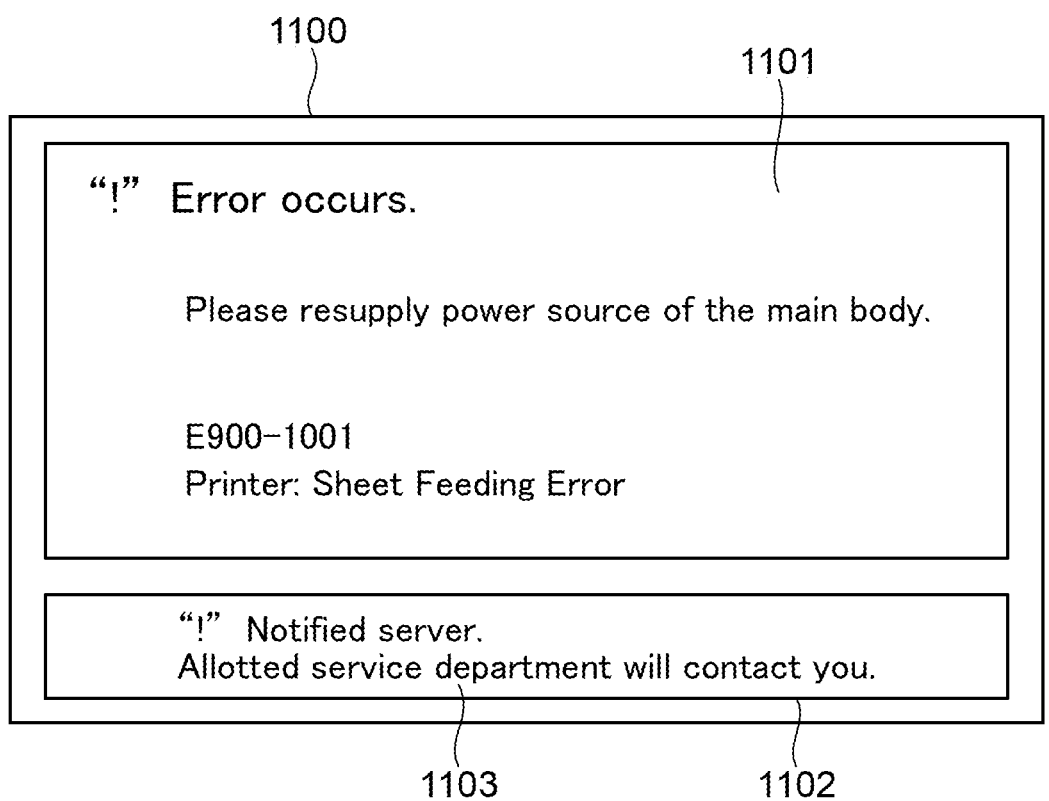
FIG. 11 is a view showing a second example of the warning screen displayed on the display unit shown in FIG. 4.

As a result of the determination in the step S106, when the communication test of the monitoring server 102 succeeded, the CPU 301 determines that the communication with the monitoring server 102 is available. The CPU 301 sends the alert information including the content of the abnormality-related alert and the identification ID of the MFP 101 to the monitoring server 102. Moreover, the CPU 301 displays a warning screen 1100 shown in FIG. 11 on the display unit 401 as notification to the user (step S107). A message 1101 showing the content and the recovery method of the abnormality detected by the MFP 101 is displayed on the warning screen 1100. In the embodiment, since the repair of the MFP 101 is requested through the monitoring server 102 when the MFP 101 is communicable with the monitoring server 102, the message 1101 does not include a content that prompts contact with the allotted service department. Moreover, a message 1103 showing that the user should wait for contact from the allotted service department because the repair is requested through the monitoring server 102 is displayed in a status line section 1102 of the warning screen 1100. Then, the CPU 301 finishes this process.

Figure 12:
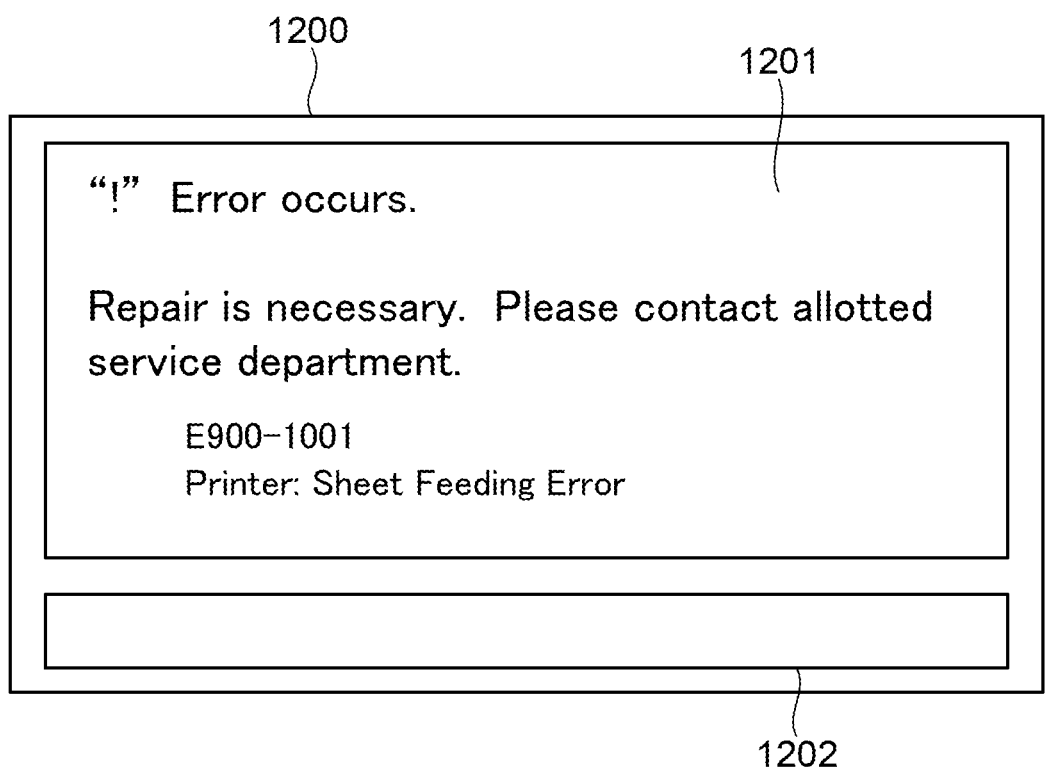
FIG. 12 is a view showing a third example of the warning screen displayed on the display unit shown in FIG. 4.

When the communication test of the monitoring server 102 failed as a result of the determination in the step S106 or when the communication setting of the monitoring server 102 is "OFF" as a result of the determination in the step S105 (i.e., when the communication with the monitoring server 102 is unavailable), the CPU 301 displays a warning screen 1200 shown in FIG. 12 on the display unit 401 as notification to the user (step S108). The warning screen 1200 includes a message 1201 that prompts contact to the allotted service department as well as the warning screen 1000. Moreover, since the CPU 301 cannot send the alert information to the monitoring server 102 when the communication with the monitoring server 102 is unavailable, the message showing that the alert information has been sent is not displayed in the status line section 1202 of the warning screen 1200. Then, the CPU 301 finishes this process.

According to the above-mentioned process in FIG. 8, it is determined whether the message that prompts contact with the allotted service department is displayed on the display unit 401 on the basis of the type of the abnormality-related alert and the communication propriety with the monitoring server 102. That is, another method to request the allotted service department to repair from a place other than the monitoring server 102 is provided. This enables the user to request the allotted service department to repair from a place other than the monitoring server even if the monitoring server cannot detect occurrence of the abnormality-related alert in the MFP 101. As a result, the allotted service department is able to cope with the abnormality-related alert quickly.

Moreover, the abnormality-related alert is the fatal error, the partial error, or the error sign in the above-mentioned process in FIG. 8. Accordingly, it is controllable whether the other method to request the allotted service department to repair from the place other than the monitoring server 102 is provided according to the degree of incidence of the occurred alert.

When the fatal error occurs, the message 1001 that prompts contact to the allotted service department is displayed on the display unit 401 in the above-mentioned process in FIG. 8. This prevents the situation where the user cannot request the allotted service department to repair when the serious abnormality that inactivates all the functions of the MFP 101 is detected.

Moreover, when the partial error occurs under the condition where the communication with the monitoring server 102 is unavailable, the message 1201 that prompts contact to the allotted service department is displayed on the display unit 401 in the above-mentioned process in FIG. 8. This prevents the situation where the user cannot request the allotted service department to repair the abnormality that inactivates the part of the functions of the MFP 101 due to the unavailable communication with the monitoring server 102.

Furthermore, when the partial error occurs under the condition where the communication with the monitoring server 102 is available, the message that prompts contact to the allotted service department is not displayed on the display unit 401 in the above-mentioned process in FIG. 8. This reduces the situation where the user requests the same content as that from the monitoring server 102 of the allotted service department.

When the error sign occurs, the message that prompts contact to the allotted service department is not displayed on the display unit 401 in the above-mentioned process in FIG. 8. This prevents confusion of the user resulting from display of an unnecessary message.

Although the present invention is described with the embodiment mentioned above, the present invention is not limited to the embodiment mentioned above. For example, when the MFP 101 cannot communicate with the monitoring server 102, a message showing that transmission of the alert information failed may be displayed in the status line section 1202 of the warning screen 1200. This enables to notify the user that the remote monitoring service is not functioning.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-028878, filed Feb. 21, 2018, which is hereby incorporated by reference herein in its entirety.

What is claimed is:

1. An image processing apparatus comprising:
a display device configured to display information; and
at least one controller configured to function to:
receive and set a setting of automatic notification for automatically notifying an external server of an occurrence of an error;
obtain detection information indicating an occurrence of an predetermined error in a case where the setting of the automatic notification is set, attempt to communicate with the external server in response to the obtain of the detection information;
determine, in accordance with a result of the attempt to communicate, whether to display a screen including information regarding the predetermined error and including information for prompting a user to report the occurrence of the predetermined error or another screen including information regarding the predetermined error and not including the information for prompting the user to report the occurrence of the predetermined error, on the display device; and
in a case where the setting of the automatic notification is not set, in response to the obtaining of the detection information, display the screen including information regarding the predetermined error and including information for prompting the user to report the occurrence of the predetermined error on the display device, without attempting to communicate with the external server.

2. The image processing apparatus according to claim 1, having a plurality of functions,
wherein the predetermined error is an error that only a part of the plurality of functions are inactivated.

3. The image processing apparatus according to claim 2, wherein the plurality of functions includes at least a scan function or a print function.

4. The image processing apparatus according to claim 1, having a plurality of functions,
wherein the predetermined error is an error different from a fatal error that all of the plurality of functions are inactivated.

5. The image processing apparatus according to claim 4, wherein the plurality of functions includes at least a scan function or a print function.

6. The image processing apparatus according to claim 1, having a plurality of functions,
wherein information indicating the predetermined error is information different from information indicating a sign that any of the plurality of functions will be inactivated in the future.

7. The image processing apparatus according to claim 6, wherein the plurality of functions includes at least a scan function or a print function.

8. The image processing apparatus according to claim 1, wherein the user is prompted to report the occurrence of the predetermined error to a person in charge of a service provided by the external server.

9. The image processing apparatus according to claim 1, wherein the controller notifies the external server of information including at least identification information of the image processing apparatus after the attempt to communicate.

10. The image processing apparatus according to claim 1, further comprising a network interface communicatable with the external server via a network.

11. The image processing apparatus according to claim 1, wherein the setting of the automatic notification is set in accordance with a use's permission instruction.

12. The image processing apparatus according to claim 1, wherein
the external server provides the image processing apparatus with a plurality of services, and
a function of the automatic notification is used for one of the plurality of services.

13. The image processing apparatus according to claim 1, wherein the another screen, which includes the information regarding the predetermined error and not include the information for prompting the user to report the occurrence of the predetermined error, further includes information indicating the user should wait for contact from a person in charge of a service provided by the external server.

14. A control method for an image processing apparatus that has a display device configured to display information, the control method comprising:
receiving and setting a setting of automatic notification for automatically notifying an external server of an occurrence of an error;
obtaining detection information indicating an occurrence of an predetermined error in a case where the setting of the automatic notification is set, attempt to communicate with the external server in response to the obtain of the detection information;
determining, in accordance with a result of the attempt to communicate, whether to display a screen including information regarding the predetermined error and including information for prompting a user to report the occurrence of the predetermined error or another screen including information regarding the predetermined error and not including the information for prompting the user to report the occurrence of the predetermined error, on the display device; and
in a case where the setting of the automatic notification is not set, in response to the obtaining of the detection information, displaying the screen including information regarding the predetermined error and including information for prompting the user to report the occurrence of the predetermined error on the display device, without attempting to communicate with the external server.

15. A non-transitory computer-readable storage medium storing a program causing a computer to execute a control method for an image processing apparatus that has a display device configured to display information, the control method comprising:
receiving and setting a setting of automatic notification for automatically notifying an external server of an occurrence of an error;
obtaining detection information indicating an occurrence of an predetermined error in a case where the setting of the automatic notification is set, attempt to communicate with the external server in response to the obtain of the detection information;

determining, in accordance with a result of the attempt to communicate, whether to display a screen including information regarding the predetermined error and including information for prompting a user to report the occurrence of the predetermined error or another screen including information regarding the predetermined error and not including the information for prompting the user to report the occurrence of the predetermined error, on the display device; and in a case where the setting of the automatic notification is not set, in response to the obtaining of the detection information, displaying the screen including information regarding the predetermined error and including information for prompting the user to report the occurrence of the predetermined error on the display device, without attempting to communicate with the external server.

* * * * *